US006475269B1

(12) United States Patent
Turner

(10) Patent No.: US 6,475,269 B1
(45) Date of Patent: Nov. 5, 2002

(54) DISK DRIVE RECIRCULATION FILTER ASSEMBLY

(75) Inventor: Robert D. Turner, Thornton, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/880,182

(22) Filed: Jun. 12, 2001

(51) Int. Cl.⁷ .......................... B01D 53/04; B01D 46/02
(52) U.S. Cl. ........................ 96/134; 96/139; 55/318; 55/385.6; 360/97.02
(58) Field of Search .................... 96/134, 139, 147; 55/315, 318, 327, 385.6, 482, 485, 488; 360/97.02, 97.03, 900

(56) References Cited

U.S. PATENT DOCUMENTS

| 3,090,490 A | * | 5/1963 | Yocum ........................ 210/251 |
| 3,142,549 A | * | 7/1964 | Klusewitz et al. ..... 128/206.17 |
| 4,307,425 A | * | 12/1981 | Kaneko et al. ........... 236/44 R |
| 4,684,510 A | * | 8/1987 | Harkins .................... 360/97.02 |
| 4,831,475 A | * | 5/1989 | Kakuda et al. ........... 236/44 R |
| 4,863,499 A | * | 9/1989 | Osendorf .................. 360/97.02 |
| 5,030,260 A | * | 7/1991 | Beck et al. .................. 360/903 |
| 5,447,695 A | * | 9/1995 | Brown et al. ............. 360/97.02 |
| 5,827,340 A | * | 10/1998 | Fiske ......................... 55/385.6 |
| 5,997,614 A | * | 12/1999 | Tuma et al. .............. 360/97.02 |
| 6,214,070 B1 | * | 4/2001 | Crowder et al. ............... 55/320 |
| 6,214,095 B1 | * | 4/2001 | Logan et al. ............... 55/385.6 |
| 6,296,691 B1 | * | 10/2001 | Gidumal .................... 360/97.02 |
| 6,395,073 B1 | * | 5/2002 | Dauber ..................... 360/97.02 |

* cited by examiner

Primary Examiner—David A. Simmons
Assistant Examiner—Frank M. Lawrence
(74) Attorney, Agent, or Firm—Sheridan Ross P.C.

(57) ABSTRACT

A filter assembly for a disk drive includes an outer shell through which gases flow in and out of the disk drive. The shell includes a tubular housing that extends into the disk drive. A first filter lies secured to an end portion of the housing and filters gases circulating within the disk drive and entering into the disk drive. The housing contains a second filter that includes an adsorbent body and a third filter that extends across an opening in the housing and helps contain the second filter within the housing.

10 Claims, 3 Drawing Sheets

FIG. 5
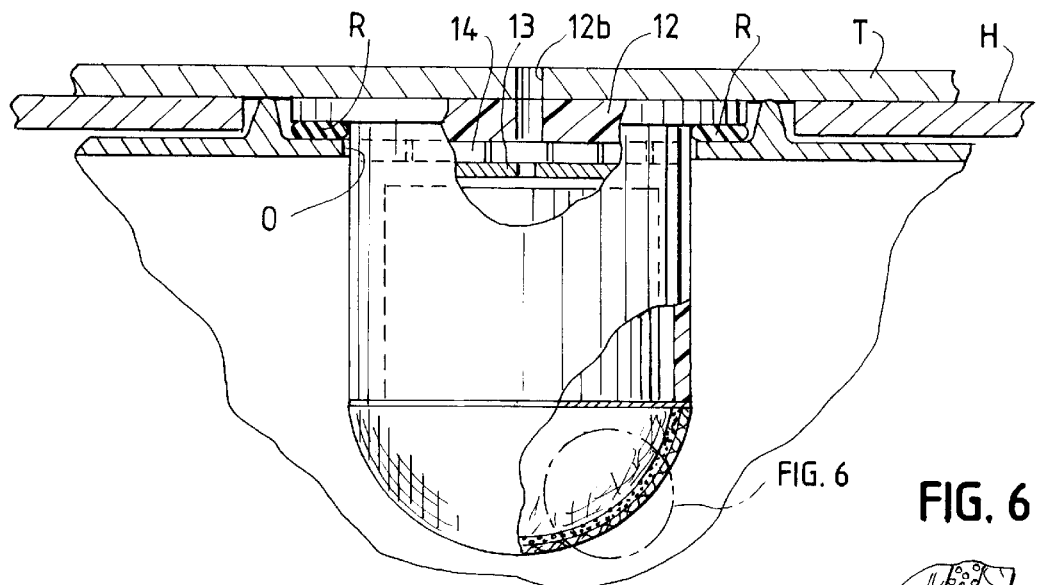
FIG. 6
FIG. 7
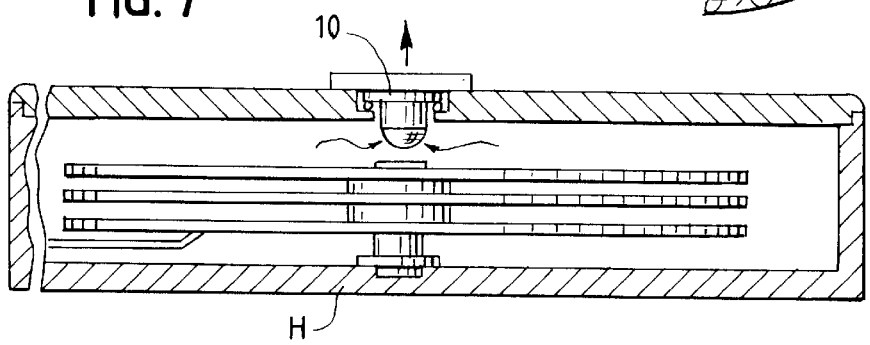
FIG. 8
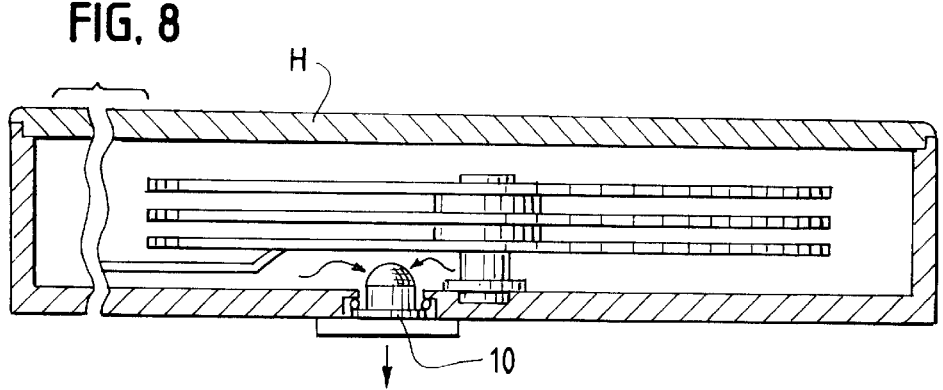

DISK DRIVE RECIRCULATION FILTER ASSEMBLY

FIELD OF THE INVENTION

This invention generally relates to filters for disk based data storage systems, and more particularly, to multi-functional filter structures which include chemical and recirculation filtering components.

BACKGROUND OF THE INVENTION

A disk drive is a data storage device that stores data in concentric tracks on a disk shaped medium. The reading of data from this medium usually entails spinning the medium about a central axis while positioning a transducer near a desired track of the medium to sense the data. The transducer provides an electrical signal representative of the sensed data to data processing circuitry within the disk drive which converts the electrical signal to a format that an attached host unit recognizes. (Disk drives can store data in any of a number of different forms, including magnetically and optically.)

A disk drive unit typically includes a housing that protects the workings of the drive from vapors, particulates and other contamination. These contaminants exist both inside and outside the disk drive housing and can have a deleterious effect on the operation of the dive. For example, particles and volatile gases inside the housing may cause problems such as stiction between the transducer and the disk, creation of thermal asperities, and even transducer crashes. To minimize such occurrences, the disk drive should include means for reducing the level of airborne particles and gases within its housing.

In addition, pressure gradients usually develop within a disk drive as a result of heating or cooling, by internal or external sources, or as a result of the acceleration and deceleration of the disks within the housing. Consequently, convection may drive air out of the drive housing or draw it into the housing through a predetermined path, such as through a filter and breather hole, or through undesirable paths such as leaks around gaskets and screw holes. In addition to contaminant movement by air flow or convection, contaminants may also move by diffusion. Diffusion is the result of a chemical gradient attempting to achieve equilibrium. Diffusion may occur inside the drive or between the inside and outside of the drive depending upon the presence of a chemical gradient.

The prior art includes a variety of filters designed to reduce the levels of undesired substances introduced into the housing of a disk drive, including multi-functional filters to filter undesired chemical vapors and particles. In many instances, these multi-functional filters are attached to the inside of the drive housing adjacent an opening in the cover or base plate. U.S. Pat. No. 5,030,260, issued Jul. 9, 1991, describes a specific example of a multi-functional filter for a disk drive assembly. This patent discloses an intricate multi-piece filter assembly comprising a number of component layers that filter incoming air. The components include external tape, diffusion plate, a first particulate filter, a first chemical adsorbent, a second chemical adsorbent, a second particulate filter, a bottom housing, including a second diffusion path, and bottom cover.

However, one disadvantage of the filter design described in the '260 patent and other prior designs is that internal or recirculated vapors cannot access the chemical or carbon filters. The filter of the present invention advantageously overcomes the problem in the prior art filters. It includes a construction in which an integrated chemical filter element is combined with a recirculation filter element in a single integrated assembly that effectively and efficiently removes contaminants from the inside of the disk drive housing. It has a simple construction which minimizes the cost of fabrication and assembly while providing consistent and reliable performance.

SUMMARY OF THE INVENTION

In accordance with one embodiment of this invention, a filter assembly for a disk drive includes an outer shell through which gases flow in and out of the disk drive. The shell includes a hollow body position or housing with an end portion that extends into the disk drive. A first filter lies secured to the end portion of the housing and filters gases circulating and recirculating within the disk drive, entering into the disk drive, and discharging from it. The first filter is a gas pervious, tent or dome-like structure that defines a pocket and includes a layer of filtering media. Air and gases move through this layer, in and out of the pocket. Vapors within the recirculating gases further come in contact with a second filter, contained within the housing, that comprises an adsorbent body. By diffusion, at least a portion of these vapors are filtered by the adsorbent, thereby improving the quality of the recirculating air. Optionally, a third filter extends across an opening at the end portion of the housing and helps contain the second filter within the housing. By combining a recirculation and integrated chemical filter into a single, integrated unit, manufacture of the disk drive is improved, as two elements are combined into one, and the combined unit may be advantageously positioned at any desired location, whether at the inside or outside diameter of the disk, or in the disk drive base plate or top cover.

BRIEF DESCRIPTION OF THE DRAWINGS

FIG. 5 is a side elevation view of the filter shown in FIG. 1 with a portion of the filter cut away to show the recirculation filter component.

FIG. 6 is an enlarged sectional view of a portion of the recirculation filter component indicated on FIG. 5.

FIG. 7 is a sectional view of a disk drive that includes a filter of the present invention.

FIG. 8 is the sectional view of FIG. 7, showing the filter of the present invention in a different location.

While the following disclosure describes the invention in connection with one embodiment, one should understand that the invention is not limited to this embodiment. Furthermore, one should understand that the drawings are not to scale and that graphic symbols, diagrammatic representations, and fragmentary views, in part, may illustrate the embodiment. In certain instances, the disclosure may not include details which are not necessary for an understanding of the present invention such as conventional details of fabrication and assembly.

DETAILED DESCRIPTION OF THE DRAWINGS

Figure 1:
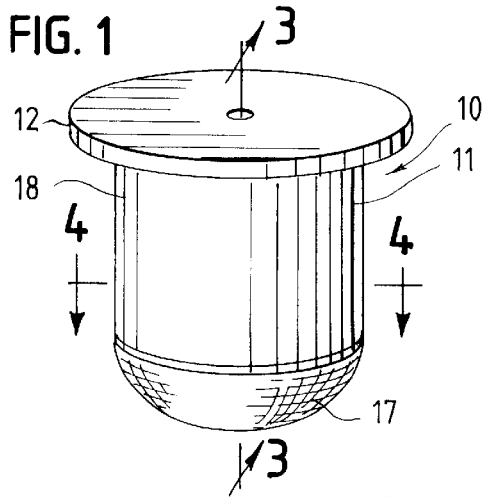
FIG. 1 is a perspective view of the filter of the present invention.
Figure 2:
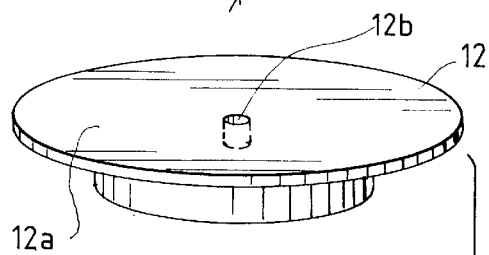
FIG. 2 is an exploded, perspective view of the filter shown in FIG. 1.
Figure 2:
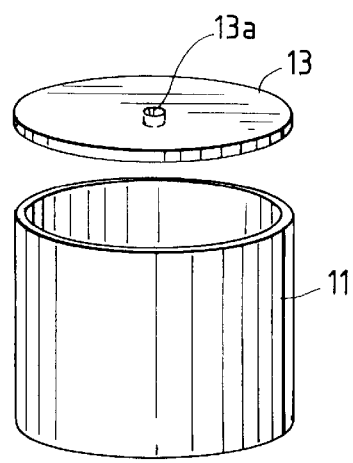
Figure 2:
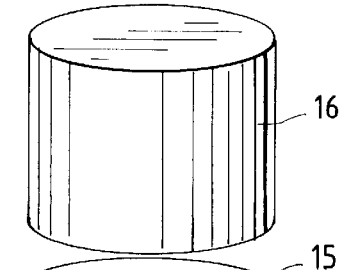
Figure 2:
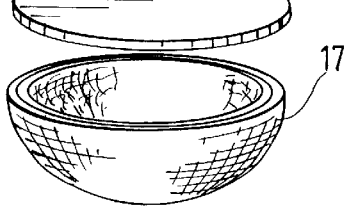

Turning now to the drawings and referring specifically to FIGS. 1 and 2, the disk drive filter assembly of the present invention 10 generally includes a housing or body 11, a cover 12, a film seal 13 disposed between the housing 11 and the cover 12, an elongate diffusion path 14 formed in the cover 12, a filter membrane 15, an adsorbent 16 disposed between the seal 13 and the filter membrane 15, and a recirculating air flow filter 17. As described in more detail below, the filter assembly 10 preferably lies mounted proximate the axis of rotation of the disk or disks of a disk drive (see FIGS. 7 and 8), although it may be advantageously positioned at any other location; and it filters both recirculating air inside the disk housing and ambient air entering the disk housing.

Figure 3:
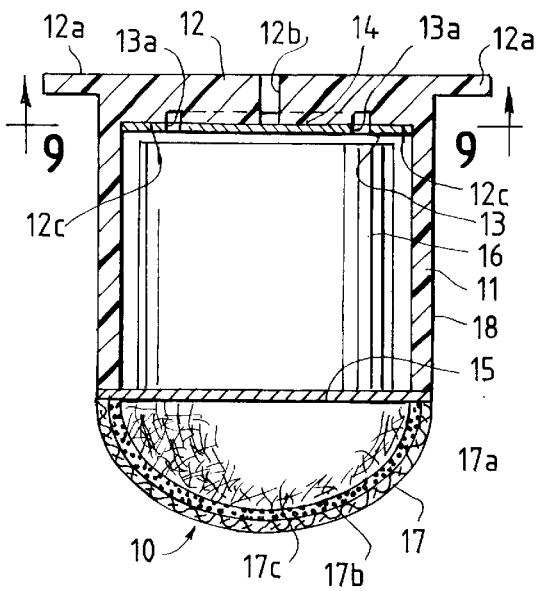
FIG. 3 is a cross-sectional view, taken along line 3—3 in FIG. 1.

The housing 11 is an injection molded (or otherwise formed) rigid body having a predetermined shape and size and made with a material such as a structural polymer (e.g., polycarbonate, nylon, PTFE, etc.) or any other suitable material. It may have any cross-sectional shape, but preferably is a tubular structure of round, oval, rectangular or other geometric cross-section that contains the adsorbent 16 in the bore that extends through it and cooperates with the cover 12 to form an outer shell 18 for the filter assembly 10. Alternatively, the housing 11 and cover 12 may be a single piece, as shown in FIG. 3, of any appropriate shape and size.

The cover 12 is a plate-like structure with edge or flange portions 12a that extend outwardly of the housing 11 to facilitate the attachment of the filter assembly 10 to the housing of the disk drive. (As more fully described below, the edge portions 12a engage disk drive housing edge portions around an opening through which the filter assembly extends into the disk drive housing. See FIGS. 5, 7 and 8.) The cover 12 is made from the same material as that of the housing 11; and it defines a breather hole or port 12b through which ambient air enters the disk drive. The seal 13 lies in a recess formed by shoulder 12c, as shown in FIG. 3, and is secured to the cover 12 with adhesive such as methyl methacrylate or with any other suitable means.

Figure 9:
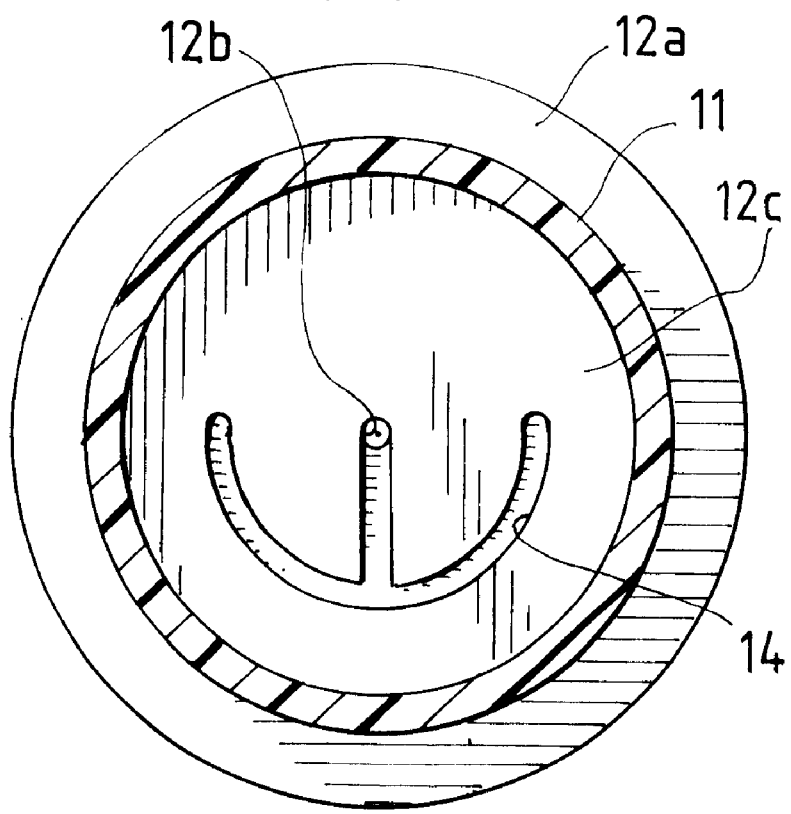
FIG. 9 is a cross-sectional view, taken along line 9—9 in FIG. 3.

The seal 13 is preferably a thin Mylar film. It covers the exposed edge of diffusion path 14 which is formed in the cover 12 as shown in FIGS. 3, 5 and 9. Also, it defines an opening 13a that lies in substantial registry with the breather hole 12b. Ambient air flows into the breather hole 12b along the diffusion path 14 and through the opening 13a in the seal 13.

The adsorbent 16 may be any of a variety of known and available adsorbents for disk drive assembly applications. Such adsorbents typically include activated carbon treated with a salt to adsorb acid gases. They may also include activated alumina or other suitable substances. As stated above, the adsorbent body 16 lies in the housing 11, and it has a size and shape that allows air to flow around it so that it may adsorb the acid gases and other undesirable chemicals present in recirculated air or in external air introduced into the drive housing.

The filter membrane 15 is a breather filter seal that spans the bottom opening of the housing 11. One may secure the filter membrane 15 to the housing 11 in a variety of known ways, including adhesive bonding, snap fitting, etc. The filter membrane 15 helps contain the adsorbent body 16 in the housing 11, and it filters air and other gases moving through the filter assembly 10. It may be constructed of a variety of known materials for disk drive assembly applications, including a laminate of polypropylene and PTFE. Such a laminate material may be acquired from Donaldson, Inc. of Minneapolis, Minn., or W. L. Gore of Elkton, Md.

The recirculation filter 17 is a two-layer component, including an outer layer or scrim 17a made of fibrous or thin film polypropylene, polyethylene, nylon, PTFE, or any other suitable permeable material and an inner layer 17b made of polypropylene-modacrylic or any other suitable electrostatic material. (See FIGS. 5 and 6). The outer scrim provides the structural integrity for the filter 17 and holds the filter media in an oval dome-like shell that defines an inner cavity 17c. The periphery of the filter 17 is secured to the periphery of the housing 11 by an adhesive, ultrasonic bond or heat bond. Alternatively, the filter 17 may also include a rigid frame (not shown) which mechanically attaches to the housing 11, such as by a snug-fit relationship, or which is bonded to the housing by an adhesive, ultrasonic bond or heat weld, or the rigid frame may become a molded part of the body 11. The filter media filters air and gases flowing into and out of this cavity 17c. In addition, some of the air that flows into the cavity 17c also diffuses through the filter membrane 15, to the adsorbent 16, and back through these filter components to remove vapors in the recirculating internal air.

Figure 4:
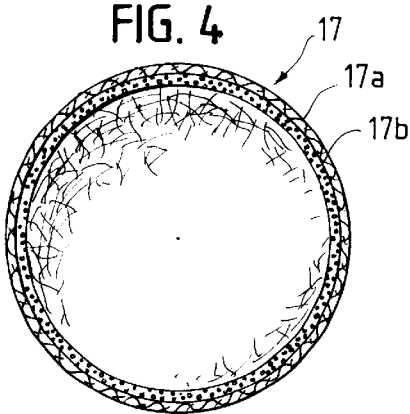
FIG. 4 is a cross-sectional view, taken along line 4—4 in FIG. 1.

Although the filter assembly 10 described in the text above includes a breather hole 12b at the top of the assembly (i.e., through the top of the cover 12), the assembly may alternatively have the breather opening extend through the side of the cover 12 or the housing 11. In addition, the recirculation filter 17, the housing 11 and the cover 12, may have any one of a wide variety of shapes other than the oval shape shown in the drawings. (See FIG. 4). Also, the recirculation may include only one self supporting filter layer without a supporting scrim layer.

The filter assembly 10 extends through an opening O in the disk drive housing H with the edge portions 12a of the cover 12 resting on edge portions of the housing H around opening O. (See FIG. 5). A seal ring R provides an airtight seal between the assembly 10 and the housing H while a strip of tape T secures the assembly 10 in place. Preferably, the assembly 10 should lie proximate the center of rotation of the disk or disks in the drive assembly as that is a low pressure zone in the drive housing H. (See FIGS. 7 and 8).

While the above description and the drawings disclose and illustrate one embodiment, one should understand, of course, that the invention is not limited to this embodiment. Those skilled in the art to which the invention pertains may make other modifications and other embodiments employing the principles of this invention, particularly upon considering the foregoing teachings. Therefore, by the appended claims, the applicant intends to cover any modifications and other embodiments as incorporate those features which constitute the essential features of this invention.

What is claimed is:

1. In combination, a filter assembly for a disk drive, said combination comprising:
   a disk drive including a drive housing, and means mounted in said drive housing for storing data;
   a filter assembly including a tubular housing and an opening formed at a distal end portion of said tubular housing, said housing mounted in the disk drive, said tubular housing defining an interior space;
   a first chemical filter disposed within said interior space, said first filter for adsorbing vapors;
   a second filter disposed at the end portion of the tubular housing, proximate the opening;
   said second filter extending outwardly of the tubular housing and defining a pocket outside of the tubular housing for receiving gases that flow within the disk drive such that a portion of said gases are also exposed to said first filter; and a hole formed in said tubular housing, said hole interconnecting the environment surrounding the disk drive and the interior space thereby allowing environmental gases to enter and escape the disk housing through said filter assembly in response to pressure changes within the disk drive.

2. The filter assembly of claim 1, further comprising a diffusion path formed in said housing for gases entering into the filter assembly through said hole.

3. The filter assembly of claim 1, further comprising a third filter member disposed across the opening, said third filter member helping contain said first filter in the housing.

4. The filter assembly of claim 1, wherein said second filter member includes an outer, scrim layer and an inner filter layer.

5. In combination, a filter assembly for a disk drive, said combination comprising:

- a disk drive including a drive housing, and means mounted in said drive housing for storing data;
- a filter assembly including a tubular housing with openings at opposite ends and a cover for closing one of the openings;
- a first filter disposed at an end portion of the tubular housing, proximate the other of the openings;
- said first filter extending outwardly of the tubular housing and defining a pocket outside of the tubular housing for receiving gases that flow within the disk drive and gases that flow in and out of the disk drive;
- a second filter disposed in the tubular housing; and
- a third filter disposed across the other of the openings, said third filter helping contain the second filter in the tubular housing.

6. The filter assembly of claim 5, wherein the cover includes a port that serves as an inlet as well as a discharge opening for the filter assembly.

7. The filter assembly of claim 5, further comprising a diffusion path disposed within said cover for gasses entering into the filter assembly.

8. The filter assembly of claim 5, wherein the second filter is an adsorbent body disposed in the housing.

9. The filter assembly of claim 5, wherein the first filter has a dome shaped configuration.

10. In combination, a filter assembly for a disk drive, said combination comprising:

- a disk drive including a drive housing, and a means mounted in said drive housing for storing data;
- a filter assembly including a filter housing mounted in said disk drive, a first filter disposed within said filter housing for absorbing vapors, a second filter disposed adjacent said first filter, said second filter extending outwardly from the filter housing and into the drive housing defining a pocket outside of the filter housing for receiving gases that flow within the disk drive such that a portion of said gases are also exposed to said first filter; and
- a hole formed in said filter housing, said hole interconnecting the environment surrounding the disk drive and the filter assembly thereby allowing environmental air to enter and escape the drive housing through said filter assembly.

* * * * *